July 13, 1965 W. H. MOKSU ETAL 3,194,924
THERMALLY RESPONSIVE ELECTRICAL SWITCH
Filed May 16, 1962
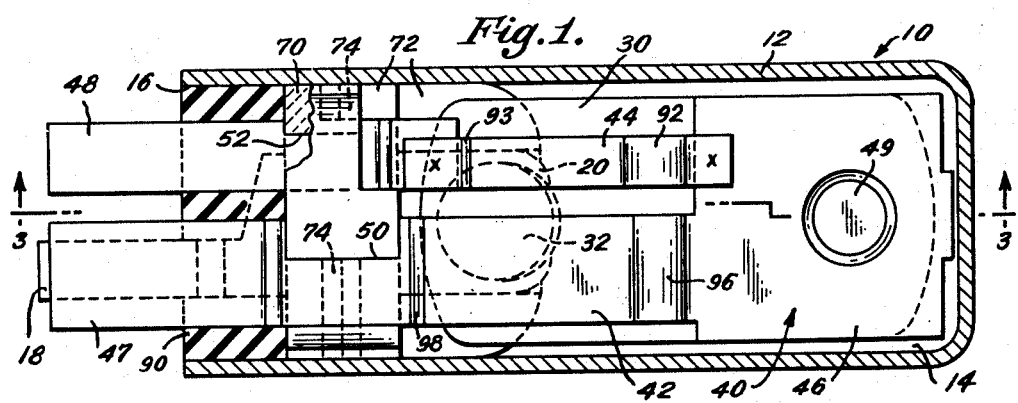
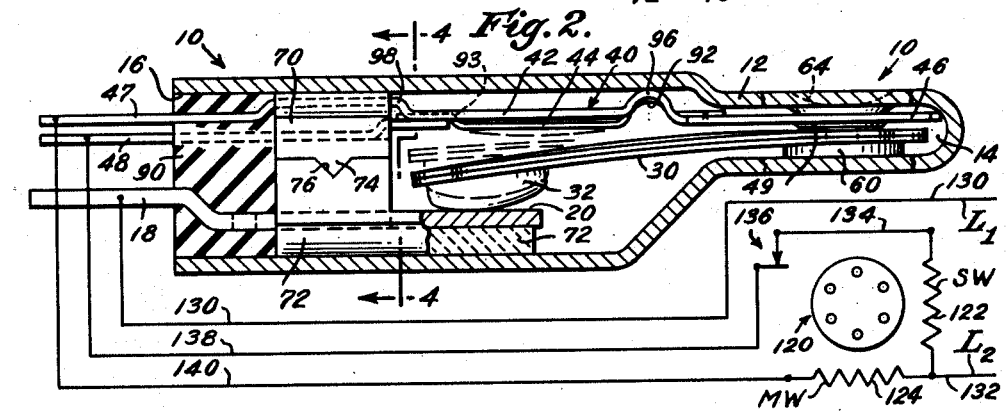
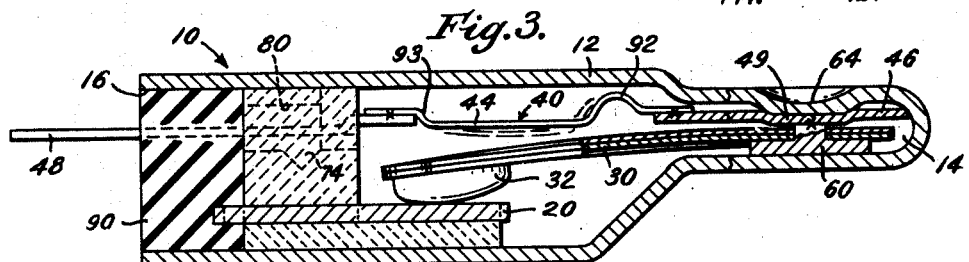
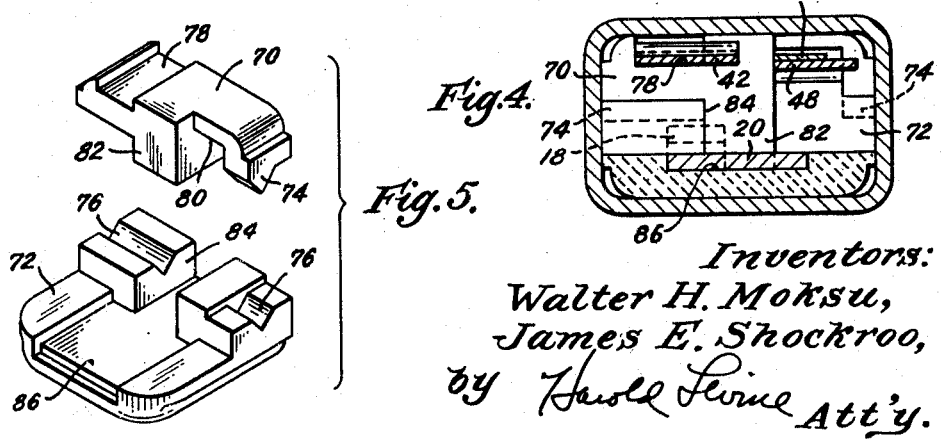
Inventors:
Walter H. Moksu,
James E. Shockroo,
by Harold Levine Att'y.

3,194,924
THERMALLY RESPONSIVE ELECTRICAL SWITCH
Walter H. Moksu, Attleboro, and James E. Shockroo, Norton, Mass., assignors to Texas Instruments Incorporated, Dallas, Tex., a corporation of Delaware
Filed May 16, 1962, Ser. No. 195,132
13 Claims. (Cl. 200—122)

This invention relates to thermally responsive electrical switches and more particularly to such switches which are useful as overload protectors for electric motors.

Among the several objects of this invention may be noted the provision of overload protective switches which will effectively protect electric motors against various types of overload conditions, including both locked rotor and running overload types; the provision of such switches which are reliable in operation, have a minimum number of components and have minimum complexity; the provision of such switches which are simple in construction, particularly adapted for miniaturization and inexpensive to assemble and manufacture; and the provision of such switches which are capable of exercising control over the temperature of an electrical apparatus incorporating more than a single independently heat generating, electrical current flow path.

Other objects and features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings in which one of the various possible embodiments of the invention is illustrated:

FIG. 1 is a top plan view with parts broken away of an electrical switch according to one embodiment of the present invention;

FIG. 2 is an elevational view of the switch shown in FIG. 1 with parts broken away and parts in section;

FIG. 3 is a sectional view taken on line 3—3 of FIG. 1;

FIG. 4 is a sectional view taken on line 4—4 of FIG. 2; and

FIG. 5 is an exploded perspective view of the header members of the switch shown in FIG. 1.

Similar reference characters indicate corresponding parts throughout the several views of the drawings.

Dimensions of certain of the parts as shown in the drawings may have been modified and/or exaggerated for the purposes of clarity of illustration.

The present invention is an improvement over the invention disclosed and claimed in a copending application of Walter H. Moksu and Henry David Epstein, Serial No. 812,528, filed May 11, 1959, now Patent No. 3,104,296, issued September 17, 1963, and entitled "Thermostatic Switches," which is assigned to the assignee of the present application.

The switch of the present invention like that disclosed in the above-mentioned copending application, is particularly adapted for miniaturization and because of its miniaturized construction, is particularly useful for motor protective applications and can conveniently be inserted into the small spaces directly adjacent the heated parts of motors to which a temperature response is to be made by the switch.

Referring now to the drawings, there is shown in FIGS. 1-3, a heat and current sensitive thermally responsive switching device generally referred to by numeral 10.

Switch 10 comprises a metallic electrically and thermally conductive housing or can 12. An example of a suitable material for can 12 is steel. Can 12 has a closed end portion 14 of reduced cross-sectional area and an open ended portion 16, through which is inserted a thermally responsive switching assembly which will be described below.

Switch 10, as best seen in FIG. 2, includes a first electrically conducting terminal 18, formed for example, of Monel or steel which includes a portion extending exteriorly of the open end 16 of casing 12 for electrical connection to an external circuit, and a portion disposed within casing 12 which is clad with silver or the like to provide a stationary electrical contact 20.

Switch 10 also includes a thermally responsive snap-acting element 30 which may be formed of a conventional thermostatic composite material such as bimetal, for example. Snap-acting element 30 is provided with a nondevelopable or deformed portion which is responsible for its snap action, and operates in a manner well known in the art. Element 30, at its free end, carries an electrical contact 32 which is electrically connected thereto and is positioned for movement into and out of mating engagement with stationary contact 20 as best seen in FIGS. 2 and 3.

One of the features of the present invention lies in the provision of a switch particularly adapted for miniaturization and which also includes a two-heater type arrangement to provide for so called "Total" or "Complete" protection for motors. U.S. Patent Nos. 2,996,590 to Shockroo and Moksu, issued August 15, 1961; 2,768,342 to V. G. Vaughan et al., issued October 23, 1956; 3,004,203 to H. D. Epstein, issued October 10, 1961, and 3,031,551 to A. P. White et al., issued April 24, 1962 (all of which patents are assigned to the assignee of the instant application), disclose two-heater motor protector arrangements which are useful for providing so called total or complete motor protection. Reference to these patents may be had for further details of the concept of total protection and the various abnormal conditions which can cause overheating and burnout of the motor windings, against which the switch of the present invention (though in miniaturized form) provides protection.

Switch 10 includes a substantially U-shaped or furcated electrically conductive upper terminal member generally referred to by numeral 40. Upper terminal member 40 includes first and second leg portions 42 and 44 comprising electrical heater members formed of thermally conductive, electrically resistant material and which are interconnected by a bight portion 46. Each of heater members 42 and 44 respectively include a terminal portion 47 and 48 extending exteriorly of casing 12 for electrical connection to an external circuit as best seen in FIG. 2. Heater member 44 preferably has substantially greater electrical resistance than heater member 42. Member 44 comprises an elongated strip formed of a material having a substantial electrical resistance and welded at its opposite ends, respectively, to terminal portion 48 and bight portion 46. In a motor protection application, heater 44 comprises the start winding heater while lower resistance heater 42 comprises the main winding heater. Suitable examples of materials for heater 44 are a "Chromel–A" alloy, a trademark for a chrome-nickel alloy comprising approximately 78% nickel, 20% chromium, 2% (maximum) manganese and 0.06% carbon; Inconel, a registered trademark for a high nickel-chromium alloy containing approximately 79.5% nickel, 13.0% chromium, 6.5% iron, 0.25% manganese, 0.25% silicon, 0.08% carbon and 0.20% copper; and Nichrome, a registered trademark for an alloy containing 15–16% chromium, 59–62% nickel, about 24% iron and 0.1% carbon. Monel is a suitable example of a material for heater member 42 and also for a bight portion 46, and terminal portions 47, 48. While heater 42, bight portion 46 and terminal portion 47 have been shown as integrally formed (e.g., as by stamping), it will be understood that if desired, these parts can be separately formed and interconnected as by welding or can in some cases be formed integrally with heater member 44 and terminal 48. Each of heater members 42 and 44 are also respectively provided with notched portions 50 and 52 for a purpose to be described below.

Snap-acting thermal element 30, at one end thereof is electrically connected to and cantilever mounted on U-shaped member 40 adjacent the bight portion 46, as by welding, as shown. Element 30 is provided adjacent the end thereof remote from contact 32, with a welding slug or projection 60 for this purpose. Welding projection 60 also co-operates to provide a good heat conductive, as well as a good electrically conductive, connection with the upper terminal member 40. As best seen in FIGS. 2 and 3, the bight portion 46, end of terminal 40 and the cantilever mounted end of snap-acting element 30 are disposed in the closed end portion 16 of cam or housing 12. Bight portion 46 is provided with a deformed or depressed portion 49 which serves a dual function of (1) providing a welding surface to facilitate securing terminal 40 to element 30 without substantially deleteriously affecting the calibration of element 30, and (2) co-operating and interfitting with a complimetary shaped depression 64 formed in the reduced cross-section end 16 of can 12 after the terminal 40-disc element 30 subassembly is inserted therein as shown in FIGS. 2 and 3 to accurately position this subassembly in the housing 12 and to inhibit relative movement therebetween.

The depressed portion 49 co-operates with weld projection 60 to advantageously permit forming the snap-acting deformation in the disc element 30 prior to assembly with terminal member 40 and permits welding and mounting of element 30 thereafter without substantially deleteriously affecting the calibration or temperature set of the element 30. Switch 10, after assembly, can be further calibrated by externally bending reduced cross-section closed end portion 14 of housing 12 as described in the aforementioned Moksu et al. copending application. In this regard, depression 49 in co-operating with depression 64 to prevent relative movement between the terminal 40-element 30 sub-assembly and the casing 12, permits more accurate and reliable external calibration of the switch 10.

Switch 10 also includes a header means comprising two interfitting header members respectively designated by numerals 70 and 72. Members 70 and 72 are preferably formed of an electrically insulating material preferably a ceramic material, so as to avoid the use of organic or resinous base materials which, upon breakdown, could cause a build up of undesirable gases within the switch 10. Member 70 is provided with a pair of spaced triangular shaped projections 74 which mate with and are received in a pair of spaced complimentary shaped notches 76 provided by member 72 (see FIG. 5) which serves to align and maintain the header members 70 and 72 in final aligned assembly. Header member 70 is also provided with a pair of spaced notched portions 78 and 80 (as best seen in FIGS. 4 and 5) which respectively receive therewithin, notched portions 50 (of terminal member 47) and 52 (of terminal member 48). Header member 70 also includes a projection 82 which is received within a correspondingly shaped notched portion 84 provided by header member 72, as best seen in FIGS. 4 and 5. Notched portion 84 also co-operates with and receives therewithin, a notched portion 86 of the lower terminal member 18. When header members 70 and 72 are in mating and interfitting engagement (i.e., projections 74 are received within notched portions 76 and projection 82 is received within notched portion 84) members 70 and 72 will sandwich terminals 18 and 48 therebetween as best seen in FIG. 4. In practice, U-shaped upper terminal member 40, snap-acting strip type disc 30 are generally preassembled as a separate subassembly. This subassembly can then be quickly assembled with header member parts 70 and 72 as described above and slidably inserted into can or tubular casing 12, with the bight portion 46 and the cantilever mounted end of element 30 received in the closed-end portion of the casing 12, as best seen in FIG. 2 as described above. Thereafter depression 64 in can 12 is formed to align and retain the parts in final assembled relation. Thereafter an electrically insulating adhesive compound 90, which may, for example, take the form of an epoxy potting compound, is introduced into the open end 16 of the can 12, as shown. The potting compound 120 co-operates to mount, seal and maintain the assembly in fixed final assembled position within the can or housing 12. The dimensions of ceramic header members 70 and 72 are such as to closely interfit with the interior dimensions of the tubular casing 12, to prevent the potting compound 90 from seeping or leaking past the header members into the interior of the can 12.

Switches according to the present invention are particularly adapted for miniaturization and have been made as small as 1.250" long (not including terminal projections), 0.493" in width and 0.296" in thickness. The problem of electrical clearances and required spacing between parts is particularly acute in such miniaturized constructions. Thermal expansion of parts upon heating in such miniaturized constructions, also presents spacing and clearance problems. In the construction of the switch 10, as thus far described, it will be noted that the free ends of heater members 42 and 44 are restricted against longitudinal movement through their connection with the bight portion 46 and with header members 70 and 72. In this arrangement, particularly with the close spacing between parts, there is the danger that heater members 42 and 44 will flex on thermal expansion and make undesirable contact with other parts of the switch, e.g., with the electrically conductive housing 12, which could cause a shorting of the heater members. Such shorting (which would vary from device to device in mass production) can deleteriously affect the operation of the switch 10, particularly in locked rotor conditions in a motor protection application where a fast switching response is required. This thermal expansion problem is particularly acute for high resistance heater 44. The present invention also provides means for obviating these problems.

Heater member 44 is deformed adjacent its ends as at 92 and 93 (see FIG. 3) whereby when heater member 44 undergoes thermal expansion (at the relatively high temperatures to which it is heated when in service) the central portion thereof will flex toward the thermally responsive element 30 (thereby moving into more intimate heat transfer relation with element 30) and away from casing 12 toward the dashed line position shown in FIGS. 2 and 3. The spacing between heater member 44 and thermally responsive element 30 is such that heater member 44, upon flexing on thermal expansion, generally will not move into engagement with element 30 when the latter is in the contacts-closed condition. This advantageously permits a closer spacing between the casing 12 and the heater members 44 and 42 with casing 12 advantageously serving as a heat sink. The problem of thermal expansion for the lower resistance heater 42 is not as pronounced as that for the high resistance heater 44. If desired, heater 42 may also be provided with deformed portions 96 and 98 adjacent its ends for the same purpose as that described above for heater member 44. As clearly shown in FIG. 1, heater members 42 and 44 directly overlie and are positioned closely adjacent to one side of thermally responsive element 30 to provide efficient and maximum heat transfer therebetween. The connection between the bight portion 46 and the thermally responsive element 30 also provides a good heat conductive path for transferring heat from the heater members to the thermally responsive element 30.

Switch 10 can be electrically connected in a motor protector circuit such as the exemplary circuit schematically illustrated in FIG. 2 to provide total type motor protection such as described, for example, in the aforementioned U.S. Patent Nos. 2,996,590; 2,768,342; 3,004,203 and 3,031,551.

Referring now to FIG. 2, switch 10 is illustrated in a circuit with a motor generally indicated by numeral 120 having an auxiliary start or phase winding 122 and a main or running winding 124. The start or phase winding 122 and the main or run winding 124 are respectively indicated in FIG. 2 by the letters SW and MW. One power supply line, $L_1$, is connected by a conductor 130 to terminal 18. The other side of the power supply source or line, $L_2$, is connected by a conductor 132 to the common connection between the start winding 122 and the main winding 124. The other end of the start winding 122 is connected by a conductor 134 to a start winding disconnect switch schematically illustrated and generally designated by refernece numeral 136, and then by conductor 138 to terminal 48. The other end of the main or running winding 124 is connected by conductor 140 to terminal 47.

As thus connected it will be observed that current in the starting winding 122 flows from one side $L_2$ of the power supply line through conductor 132, start winding 122, conductor 134, switch 136, conductor 138, to terminal 48, through start winding heater 44, to the bight portion 46, to one end of the snap-acting thermally responsive element 30, serially through element 30 to contact 32, to stationary contact 20, to terminal 18, to conductor 130 and to $L_1$, the other side of the power source. Current through the running or main winding 124 flows from $L_2$ through conductor 132, through the main winding 124, conductor 140, to terminal 47, through the main winding heater 42, to bight portion 46, through thermally responsive element 30, to contact 32, to stationary contact 20, to terminal 18, through conductor 130, to $L_1$, the other source of the power supply line or source.

The operation of switch 10 in the exemplary circuit described above is as follows: Under normal operating conditions of the motor 120, the heat generated by the current passing through the thermally responsive element 30 and the heaters 42 and 44 together with the heat of the motor will not be sufficient to raise the temperature of the thermally responsive element 30 to the point where it snaps to its position of opposite concavity to open the electrical contacts 30 and 20 (the contacts-open position is shown in dashed lines in FIG. 2) to de-energize the motor. If, however, the motor is subject to one or more of the overload conditions, which are described in detail in the aforementioned patents, then the heavy starting and/or running winding currents will influence their respective heaters 44 and 42, as well as the thermally responsive element 30, to cause the element 30 to move to open the circuit to both windings thus protecting the motor windings from overheating. With the arrangement described above, the influence of the temperature of each of the heaters 40 and 42 by virtue of their direct overlying thermal juxtaposition to the thermal element, will very quickly be sensed by element 30 for a quick response to protect the motor windings from overheating.

It will be understood that the heater arrangement shown in the drawings and described above may be varied, and may assume other forms or configurations without departing from the spirit of the invention. The resistance of the various heaters 42 and 44 may be varied, for example, by changing the cross sectional shape or the material from which the heating elements are made.

In view of the above, it will be seen that the several objects of the invention are achieved, and other advantageous results attained.

As many changes could be made in the above constructions without departing from the scope of the invention it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A thermally responsive electrical switch for an electrical motor having start and run windings comprising a tubular casing having an open and a closed end; a first electrically conducting terminal extending exteriorly of said casing and having a portion disposed within said casing providing a first electrical contact; a substantially U-shaped electrically conductive member disposed within and extending longitudinally of said casing; said U-shaped member having first and second leg portions comprising electrical heater members formed of thermally conductive, electrically resistant material and a bight portion interconnecting said leg portions; an elongated thermally responsive element, at one end therof, being electrically connected to and cantilever mounted on said U-shaped member adjacent the bight portion end thereof, said element, at the other end thereof, carrying an electrical contact for movement into and out of engagement with said first electrical contact; said bight portion and cantilever mounted end of said element being disposed in the closed end portion of said casing; said first and second heater members directly overlying and positioned adjacent one side of said element and having terminal portions extending exteriorly of said casing; electrically insulating header means disposed in the open end of said casing maintaining the terminal portions of said first and second heater members in spaced relation and restraining the free ends of said members against movement longitudinally thereof; at least one of said first and second members being deformed at least in part, in a direction transverse to the plane of said thermally responsive element so that upon predetermined thermal expansion, flexing of said one member toward said thermally responsive element will result; said first and second members being respectively adapted for electrical connection with said start and run windings of said motor and said first terminal being adapted for electrical connection with one one side of a power source.

2. A thermally responsive electrical switch adapted for miniaturization comprising a casing; a first electrical contact disposed within said casing; a substantially U-shaped electrically conductive member disposed within said casing and having first and second leg portions comprising electrical heater members formed of thermally conductive, electrically resistant material and a bight portion interconnecting said leg portions; an elongated thermally responsive element, at one end thereof, being electrically connected to and cantilever mounted on said U-shaped member adjacent the bight portion end thereof, said element, at the other end thereof, carrying an electrical contact for movement into and out of engagement with said first electrical contact; said first and second heater members being positioned adjacent said element; means disposed in said casing restraining the free ends of said first and second members against movement longitudinally thereof; at least one of said first and second members being deformed at least in part in a direction transverse to the plane of said thermally responsive element so that upon predetermined thermal expansion, flexing of said one member toward said thermally responsive element will result.

3. A thermally responsive electrical switch for an electrical motor having start and run windings comprising a tubular casing having an open and a closed end; a first electrically conducting terminal extending exteriorly of said casing and having a portion disposed within said casing providing a first electrical contact; a substantially U-shaped electrically conductive member disposed within and extending longitudinally of said casing; said U-shaped member having first and second leg portions comprising electrical heater members formed of thermally conductive, electrically resistant material and a bight portion interconnecting said leg portions, said first heater member having substantially greater electrical resistance than said second heater member; an elongated thermally responsive snap-acting element, at one end thereof, being electrically connected to and cantilever mounted on said U-shaped member adjacent the bight portion end thereof, said element, at the other end thereof, carrying an electrical contact for movement into and out of engagement with said first electrical contact; said bight portion and cantilever mounted end of said element being disposed in the closed end portion of said casing; said first and second heater members directly overlying and positioned adjacent one side of said element and having terminal portions extending exteriorly of said casing; electrically insulating header means disposed in the open end of said casing maintaining the terminal portions of said first and second heater members in spaced relation and restraining the free ends of said members against movement longitudinally thereof; at least a part of said first heater member being deformed in a direction transverse to the plane of said thermally responsive element so that upon predetermined thermal expansion, flexing of said first member toward said thermally responsive element will result; said first and second heater members being respectively adapted for electrical connection with said start and run windings of said motor and said first terminal being adapted for electrical connection with one side of a power source.

4. The switch as set forth in claim 3 and wherein said header means is formed of electrically insulating material and comprises first and second interfitting sections sandwiching said first terminal and first heater member therebetwen to maintain the latter in final assembled aligned position.

5. The switch as set forth in claim 4 and wherein each of said first and second interfitting sections provide a pair of spaced notched portions each respectively receiving one of said first terminal and first heater members therein.

6. The switch as set forth in claim 4 and said header means is formed of a ceramic material and said casing is formed of metal.

7. The switch as set forth in claim 6 and wherein said header means electrically insulates said first terminal from said metal casing.

8. A thermally responsive electrical switch adapted for miniaturization comprising a casing; a first electrical contact disposed within said casing; an electrically conductive member disposed within said casing and having a leg portion comprising an electrical heater member formed of thermally conductive, electrically resistant material; an elongated thermally responsive element, at one end thereof; being electrically connected to and cantilever mounted on said member adjacent one end thereof, said element, at the other end thereof, carrying an electrical contact for movement into and out of engagement with said first electrical contact; said heater member being positioned adjacent said element; means disposed in said casing restraining the free end of said heater member against movement longitudinally thereof, and said heater member being deformed at least in part in a direction transverse to the plane of said thermally responsive element so that upon predetermined thermal expansion, flexing of said member toward said thermally responsive element will result.

9. A thermally responsive electrical switch adapted for miniaturization comprising a metallic tubular casing having an open and a closed end of reduced cross-section; a first electrically conducting terminal extending exteriorly of the open end of said casing and having a portion disposed within said casing providing a first electrical contact; a substantially U-shaped electrically conductive member disposed within and extending longitudinally of said casing; said U-shaped member having first and second leg portions comprising electrical heater members formed of thermally conductive, electrically resistant material and a bight portion interconnecting said leg portions; an elongated thermally responsive element, at one end thereof, being electrically connected to and cantilever mounted on said U-shaped member adjacent the bight portion end thereof, said element, at the other end thereof, carrying an electrical contact for movement into and out of engagement with said first electrical contact; said bight portion and cantilever mounted end of said element being disposed in the closed end portion of said casing; said reduced cross section closed end portion of said casing including a deformed portion abutting and positioning said bight portion and cantilever mounted end of said element within said casing and inhibiting relative movement therebetween.

10. The switch as set forth in claim 9 and wherein said bight portion is provided with a deformed portion which is complementary in shape to and interfits with said deformed portion in said closed end section of said casing.

11. A thermally responsive electrical switch adapted for miniaturization comprising a tubular casing having an open and a closed end of reduced cross-section; a first electrically conducting terminal extending exteriorly of the open end of said casing and having a portion disposed within said casing providing a first electrical contact; a substantailly U-shaped electrically conductive member disposed within and extending longitudinally of said casing; said U-shaped member having first and second leg portions comprising electrical heater members formed of thermally conductive, electrically resistant material and a bight portion interconnecting said leg portions; an elongated thermally responsive element, at one end thereof, being electrically connected to and cantilever mounted on said U-shaped member adjacent the bight portion end thereof, said element, at the other end thereof, carrying an electrical contact for movement into and out of engagement with said first electrical contact; said bight portion and cantilever mounted end of said element being disposed in the closed end portion of said casing; said reduced cross-section closed end portion of said casing including a deformed portion abutting and positioning said bight portion and cantilever mounted end of said element within said casing and inhibiting relative movement therebetween; said first and second heater members directly overlying and positioned adjacent one side of said element and having terminal portions extending exteriorly of said casing for electrical connection in an electrical circuit; electrically insulating header means disposed in the open end of said casing maintaining the terminal portions of said first and second heater members in spaced relation and restraining the free ends of said members against movement longitudinally thereof; at least one of said first and second members being deformed at least in part, in a direction transverse to the plane of said thermally responsive element so that upon predetermined thermal expansion, flexing of said one member toward said thermally responsive element will result.

12. A thermally responsive electrical switch adapted for miniaturization comprising a tubular casing having an open and a closed end of reduced cross-section; a first electrically conducting terminal extending exteriorly of the open end of said casing and having a portion disposed within said casing providing a first electrical contact; a substantially U-shaped electrically conductive member disposed within and extending longitudinally of said casing; said U-shaped member having first and second leg portions comprising electrical heater members formed of thermally conductive, electrically resistant material and a bight portion interconnecting said leg portions; an elongated snap-acting thermally responsive element, at one end thereof, being electrically connected to and cantilever mounted on said U-shaped member adjacent the bight portion end thereof as by welding; said bight portion having a depressed portion providing a weld projection to facilitate mounting said element on said bight portion; said element, at the other end thereof, carrying an electrical contact for movement into and out of engagement with said first electrical contact; said bight portion and cantilever mounted end of said element being disposed in the closed end portion of said casing; said reduced cross-section closed end portion of said casing including a depressed portion complementary in shape to and interfitting with said depressed portion in said bight portion to position said bight portion and cantilever mounted end of said element within said casing and to limit relative movement therebetween.

13. A thermally responsive electrical switch adapted for miniaturization comprising a tubular casing having an open and closed end of reduced cross-section; a first electrically conducting terminal extending exteriorly of the open end of said casing and having a portion disposed within said casing providing a first electrical contact; a substantially U-shaped electrically conductive member disposed within and extending longitudinally of said casing; said U-shaped member having first and second leg portions comprising electrical heater members formed of thermally conductive, electrically resistant material and a bight portion interconnecting said leg portions; an elongated snap-acting thermally responsive element, at one end thereof, being electrically connected to and cantilever mounted on said U-shaped member adjacent the bight portion end thereof as by welding; said bight portion having a depressed portion providing a weld projection to facilitate mounting said element on said bight portion; said element, at the other end thereof, carrying an electrical contact for movement into and out of engagement with said first electrical contact; said bight portion and cantilever mounted end of said element being disposed in the closed end portion of said casing; said reduced cross-section closed end portion of said casing including a depressed portion complementary in shape to and interfitting with said depressed portion in said bight portion to position said bight portion and cantilever mounted end of said element within said casing and to limit relative movement therebetween; said first and second heater members directly overlying and positioned adjacent one side of said element and having terminal portions extending exteriorly of said casing for electrical connection in an electrical circuit; electrically insulating header means disposed in the open end of said casing maintaining the terminal portions of said first and second heater members in spaced relation and restraining the free ends of said members against movement longitudinally thereof; at least one of said first and second members being deformed at least in part in a direction transverse to the plane of said thermally responsive elements so that upon predetermined thermal expansion flexing of said one member toward said thermally responsive element will result.

References Cited by the Examiner
UNITED STATES PATENTS
3,031,551   4/62   White _____ 200—122

BERNARD A. GILHEANY, *Primary Examiner.*